Patented Dec. 15, 1931

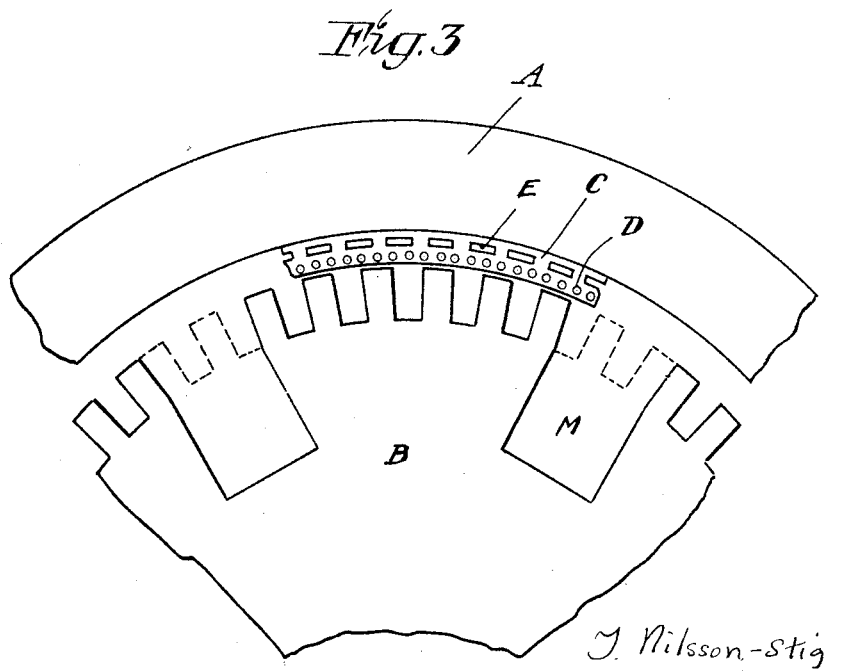

1,836,882

UNITED STATES PATENT OFFICE

TORSTEN NILSSON-STIG, OF UMEA, SWEDEN

ELECTRICAL MACHINE

Application filed August 5, 1929, Serial No. 383,600, and in Sweden August 16, 1928.

The present invention has for its object to provide electrical machines, generators, motors or converters with appreciably reduced iron losses, whereby the efficiency may in certain cases be improved upon.

The characteristic feature of the invention resides in that the armature windings are inserted into a special former or frame of electrically and magnetically insulating material, such as synthetic resins as bakelite, pressboard, presswood, paper, mica prepared or treated with synthetic resins, steatite and materials with equal properties of the proper mechanical strength, said former, or frame being placed between the magnetically active parts of the machine. Thus, the air gap will be increased, and in consequence thereto the machine requires more powerful excitation. The construction will, therefore, show to the best advantage in such types of machines where the iron losses are great in relation to the losses of excitation. This is above all the case in alternating current machines for a higher periodicity than that of the common systems of power transmission.

The invention will be more clearly described with relation to the annexed drawings, in which Figs. 1 to 3 show by way of example and diagrammatically parts of an electric machine according to different forms of embodiment. Fig. 4 is an end view of a machine having a winding arrangement according to the embodiment shown in Fig. 3.

Referring to the figures, A and B here designate the magnetically active parts of the machine. C is a former or frame of insulating solid material, and D and E are the armature windings.

As mentioned hereinbefore, this machine construction is particularly advantageous in machines for rather high alternating current frequencies.

The armature conductors of the high frequency windings may be so disposed in their frame or former as to be brought nearer to that part of the machine which is in movement relatively to the said winding during operation, and at any rate, in regard to the strength of the material of the frame, as near as possible to said part of the machine. Most high frequency machines are of the so-called inductor type, where the rotor is generally provided with slots and teeth in the iron, whereby pulsations are caused in the magnetic field. These pulsations generate the high frequency in a suitably adapted armature winding. It is then obvious that the differences in density of the magnetic field are reduced with the distance from the teeth and the slots, by reason of which it is of the greatest importance for the output of the machine that the armature winding is brought nearer to that part of the machine, which is provided with teeth and slots and which is in movement relatively to the winding during operation, than to the other magnetically active parts of the machine.

Moreover, the space between the iron masses of the stator and the rotor of the machine, which is the same as its magnetically active parts, should be made so large that the high frequency pulsations in the magnetic field are equalized as far as possible when the magnetic field has moved over the intervening space or the air-gap. It is also of importance that that part of the machine, which during operation is not in motion relatively to the armature winding, while being magnetically operative, has no slots adjacent to the air-gap or the intermediate space between the rotor and the stator, in order that the high frequent magnetic changes of density in the iron may become as small as possible.

Figs. 2 and 3 of the drawings show how the high frequency winding D is disposed in its frame C connected to the stator A, in such a manner however that the winding is brought nearer to the rotor B provided with slots and teeth. The width of the air-gap is also disclosed, and it will be seen that the stator has no slots.

High frequency machines may also be made of another type where the main magnetic field is made with pronounced poles, as shown in Fig. 3, the external portions of the main poles being provided with slots and teeeth so adapted that the high frequency pulsations in the magnetic field all around the circumference co-operate toward generating a high frequency E. M. F. in the armature winding D. This is effected in such manner that the slots of the magnet winding M at the external portions of the rotor B are given a width corresponding to an even number of slots and teeth, as shown in Fig. 3 by dotted lines. In this way, the teeth under north pole magnetization are caused to cooperate with the slots under south pole magnetization, and vice versa.

A high frequency machine with pronounced poles may also be provided with an additional armature winding for low frequency or direct current, intended to drive the machine in co-operation with the main field. This winding, which is designated by E in Fig. 3, should also be disposed in a frame or former of insulating solid material between the magnetically active parts of the machine, or, said winding may be disposed in the same frame C as the high frequency winding D.

According to the invention, electrical machines may also be devised as indicated in Fig. 1 that is to say, with the armature windings D in their frame C free from the magnetically active parts A and B, which parts are in this case in motion relatively to the armature windings during operation, the main pole pitch as well as the pitch of the slots and teeth having then to be the same in A and B.

In high frequency machines, all conductors of the armature windings should consist of finely divided enamelled copper wires, in order to reduce the copper losses as far as possible.

All rotor slots should be filled outwardly with bronze wedges, for the purpose of reducing the air friction and of retaining the magnet windings or the like.

Preferably the frames or formers intended to carry the armature windings may first be provided with slots for the conductors and may be assembled as a unit, whereupon the windings are drawn into the slots.

What I claim is:—

1. A rotary electrical machine, comprising magnetically active iron parts rotatable relatively to each other, a rigid frame or former of electrically and magnetically insulating material located between said magnetically active iron parts, and generating windings inserted in said insulating frame or former.

2. A rotary electrical machine, adapted for generating high frequence alternating current, comprising magnetically active iron parts rotatable relatively to each other, a rigid frame or former of electrically and magnetically insulating material located between said magnetically active iron parts, and generating windings inserted in said insulating frame or former, said generating winding being so disposed that the centres of gravity of the sections of its conductors will be situated nearer to that one of the above mentioned magnetically active iron parts, which during operation revolves relatively to said generating winding than to that one of said iron parts, which is stationary relatively to said winding.

3. A rotary electrical machine, adapted for generating high frequence alternating current, comprising magnetically active iron parts rotatable relatively to each other, a rigid frame or former of electrically and magnetically insulating material located between said magnetically active iron parts, and generating windings inserted in said insulating frame or former, one of said magnetically active iron parts having slots and teeth at its circumference, the gap between said iron parts being so great that the differences in the magnetic flux caused by said slots and teeth are equalized or nearly equalized, when the magnetic flux has traversed said gap.

4. A rotary electrical machine, adapted for generating high frequence alternating current, comprising magnetically active iron parts rotatable relatively to each other, a rigid frame or former of electrically and magnetically insulating material located between said magnetically active iron parts, and generating windings inserted in said insulating frame or former, that part of the said magnetically active iron parts, which during operation is stationary relatively to said generating winding, having no slots, where the high frequency pulsations of the magnetic flux enter the iron from the gap between said parts.

5. A rotary electrical machine, comprising magnetically active iron parts rotatable relatively to each other, a rigid frame or former of electrically and magnetically insulating material located between said magnetically active iron parts, and generating windings inserted in said insulating frame or former, that part of said magnetically active iron parts, which form the main magnetic field, being equipped with pronounced pole pieces, the external portions of said pole pieces being provided with slots and teeth causing such differences in the magnetic flux as to induce high frequency alternating E. M. F., said slots and teeth being so disposed that the teeth under north pole magnetization co-operate with the slots under south pole magnetization and vice versa.

6. A rotary electrical machine according to claim 5, characterized by the fact that there is inserted, in addition to the winding for generating high frequency alternating current, in that part of the machine which carries the said winding, a second winding for generating low frequency alternating current or direct current intended to drive the machine in cooperation with the main magnetic field.

In testimony whereof I affix my signature.

TORSTEN NILSSON-STIG.